(12) United States Patent
Donaldson et al.

(10) Patent No.: US 11,016,718 B2
(45) Date of Patent: May 25, 2021

(54) CONFORMING LOCAL AND REMOTE MEDIA CHARACTERISTICS DATA TO TARGET MEDIA PRESENTATION PROFILES

(71) Applicant: JAWB Acquisition LLC, New York, NY (US)

(72) Inventors: Thomas Alan Donaldson, London (GB); Michael Edward Smith Luna, San Jose, CA (US)

(73) Assignee: JAWB ACQUISITION LLC, New York, NY (US)

( * ) Notice: Subject to any disclaimer, the term of this patent is extended or adjusted under 35 U.S.C. 154(b) by 0 days.

(21) Appl. No.: 13/917,225

(22) Filed: Jun. 13, 2013

(65) Prior Publication Data

US 2014/0371889 A1 Dec. 18, 2014

(51) Int. Cl.
*G06F 17/00* (2006.01)
*H03G 3/00* (2006.01)
*G06F 3/16* (2006.01)

(52) U.S. Cl.
CPC ................... *G06F 3/165* (2013.01)

(58) Field of Classification Search
CPC . G06F 3/165; H04M 1/6016; H04M 1/72522; H04M 1/72558

USPC .......................... 381/104; 700/94; 710/5, 36
See application file for complete search history.

(56) References Cited

U.S. PATENT DOCUMENTS

| 8,406,431 | B2 * | 3/2013 | Nandury | ................ | H03G 7/007 381/71.11 |
|---|---|---|---|---|---|
| 2011/0019839 | A1 * | 1/2011 | Nandury | ....................... | 381/107 |
| 2011/0239142 | A1 * | 9/2011 | Steeves et al. | ............... | 715/764 |
| 2014/0168277 | A1 * | 6/2014 | Ashley et al. | ................ | 345/672 |

* cited by examiner

*Primary Examiner* — Fan Tsang
*Assistant Examiner* — Eugene Zhao
(74) *Attorney, Agent, or Firm* — Hard IP LLC

(57) ABSTRACT

Techniques associated with conforming local and remote media characteristics data to target media presentation profiles are described, including a media characteristic configuration module comprising an audio characteristic manager configured to modify an audio portion of media content data received from a source to conform the audio portion to a target audio characteristic indicated in a target configuration profile, and to modify an audio portion of other media content data received from another source to conform the audio portion to the target audio characteristic indicated in the target configuration profile, a communication facility configured to receive media content data from different sources using different data communication protocols, and a storage device configured to store target configuration profiles and data associated with media content.

19 Claims, 5 Drawing Sheets

CONFORMING LOCAL AND REMOTE MEDIA CHARACTERISTICS DATA TO TARGET MEDIA PRESENTATION PROFILES

FIELD

The present invention relates generally to electrical and electronic hardware, computer software, wired and wireless network communications, and computing devices. More specifically, techniques related to conforming local and remote media characteristics data to target media presentation profiles are described.

BACKGROUND

Conventional devices and techniques for conforming media characteristics data to desired media presentation characteristics for a media output device are limited in a number of ways. Conventional media devices (i.e., media players, such as speakers, televisions, computers, e-readers, and smartphones) typically are not well-suited for normalizing or standardizing media presentation characteristics across different types of media content from different sources, including local and remote sources. Conventional media devices typically play songs or videos being streamed over a Bluetooth® profile according to a different set of media presentation data than other Internet content being streamed over wireless Internet (WiFi), the differing sets of media presentation data not being conformed, resulting in differences in volume, loudness, and sound quality. Similarly, conventional media devices typically are not well-suited to conform the quality of other media content, such as video content, across disparate sources.

Thus, what is needed is a solution for conforming local and remote media characteristics data to target media presentation profiles without the limitations of conventional techniques.

BRIEF DESCRIPTION OF THE DRAWINGS

Various embodiments or examples ("examples") are disclosed in the following detailed description and the accompanying drawings.

Figure 1:
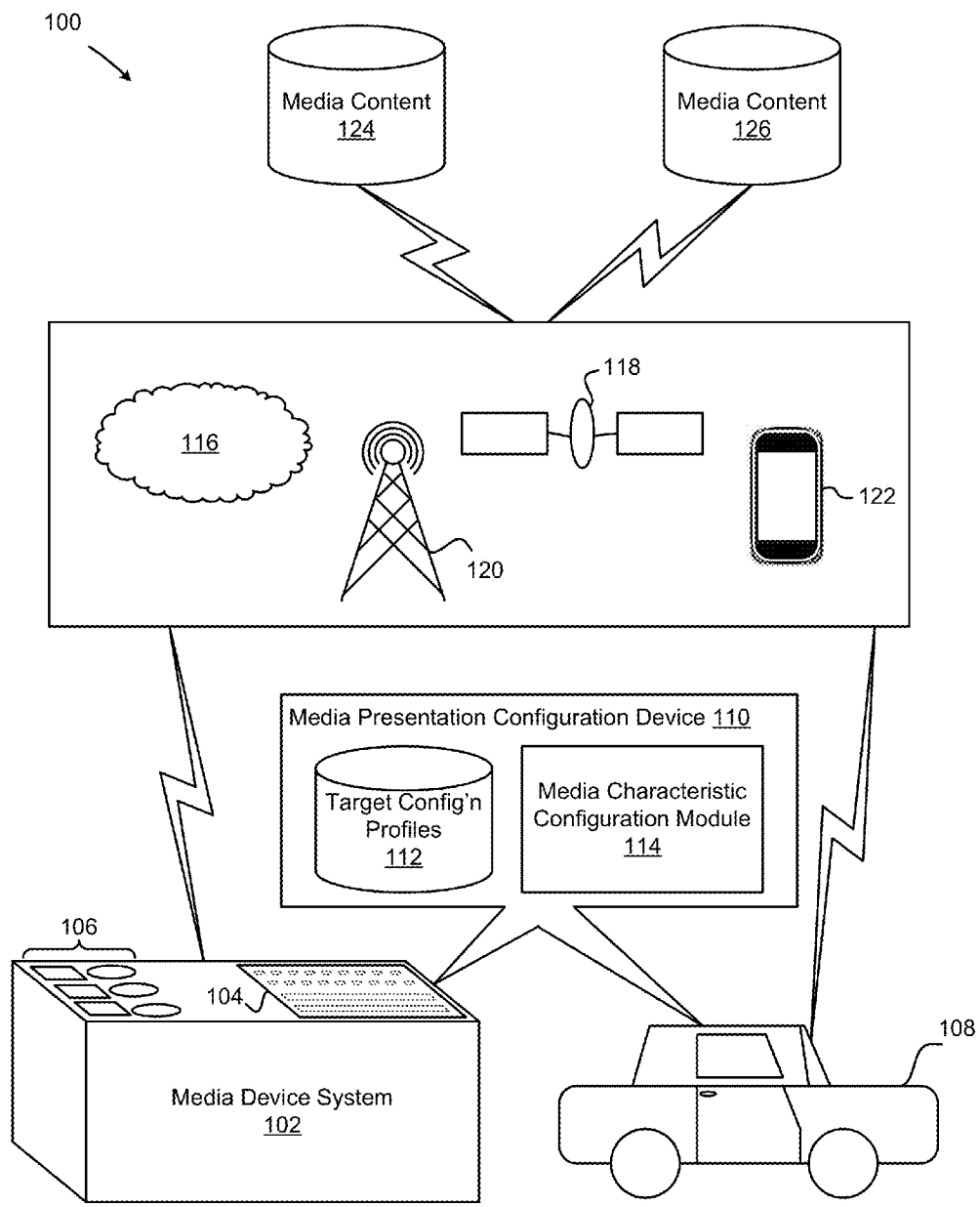
FIG. 1 depicts exemplary device systems implementing a media presentation configuration device for conforming local and remote media characteristics data to target media presentation configuration profiles.

Although the above-described drawings depict various examples of the invention, the invention is not limited by the depicted examples. It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, then the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Software and/or firmware implementations may be embodied in a non-transitory computer readable medium configured for execution by a general purpose computing system or the like. The described techniques may be varied and are not limited to the examples or descriptions provided.

FIG. 1 depicts exemplary device systems implementing a media presentation configuration device for conforming local and remote media characteristics data to target media presentation configuration profiles. Here, diagram 100 includes media device system 102 (including display 104 and buttons 106), car system 108, media presentation configuration device 110 (including target media presentation configuration profiles (hereinafter "target configuration profiles") database 112 and media characteristic configuration module 114), network 116, satellite 118, cellular site (hereinafter "cell tower") 120, mobile device 122, and media content databases 124-126. In some examples, media device system 102 may include media presentation capabilities (e.g., media player, speakers, display 104, other audio and video output capabilities, and the like), for example, to play music, movies, videos, output audio and video from telephone or videophone calls, and the like. In some examples, media device system 102 may include buttons 106, which may be configured to execute control functions associated with media device system 102, including, without limitation, to turn media device system 102 on or off, adjust a volume, set an alarm, request information associated with media device system 102 (e.g., regarding battery life, communication protocol capabilities, or the like), provide a response to a prompt from media device system 102, or the like. In some examples, display 104 may be implemented as a light panel using a variety of available display technologies, including lights, light-emitting diodes (LEDs), interferometric modulator display (IMOD), electrophoretic ink (E Ink), organic light-emitting diode (OLED), or the like, without limitation. In other examples, display 104 may be implemented as a touchscreen, other type of interactive screen, a video display, or the like. In some examples, media device system 102 may include software, hardware, firmware, or other circuitry (not shown), configured to implement a program (i.e., application) configured to cause control signals to be sent to display 104, for example, to cause display 104 to present a light pattern, a graphic or symbol (e.g., associated with battery life, communication capabilities, or the like), a message or other text (e.g., a notification, information regarding audio being played, information regarding characteristics of smart media device 104 and 124, or the like), a video, or the like.

In some examples, car system 108 also may be implemented with various media presentation capabilities (e.g., media player, speakers, displays, other audio and video output capabilities, and the like), for example, to play music, movies, videos, output audio and video from telephone or videophone calls, and the like. In some examples, media device system 102 and car system 108 may be configured to implement media presentation configuration device 110. In some examples, media presentation configuration device 110 may be configured to modify media content data (e.g., received from media content databases 124-125, or the like) to conform (i.e., match, or modify to be substantially similar) one or more characteristics (e.g., audio characteristics (e.g., volume, loudness, perceived loudness, frequency (i.e., equalization), tone, and the like), video characteristics (e.g., brightness, resolution, aspect ratio, color, quality, and the like), or other media presentation characteristics) in a target configuration profile (e.g., stored in target configuration profiles database 112, other storage or memory, or the like), which may be configured to specify preferred, optimum, desired or target characteristics for media presentation using media device system 102 and car system 108. In some examples, conforming media content data to a target configuration profile may standardize, normalize, compress, or otherwise modify to a preferred, optimum, desired or target (hereinafter "target") range for a media presentation characteristic. For example, media characteristic configuration module 114 may be configured to normalize, compress, or otherwise modify, volume data associated with media content to a target volume range (i.e., associated with one or more target configuration profiles stored in target configuration profiles database 112), so that the output volume for media content from any source (e.g., media content databases 124-126, or the like), including two or more different sources, will be the same or substantially similar (e.g., volume output for media content from one media service will be the same or similar to volume output for media content from another media service, volume output for media content from a local source will be the same or similar to volume output for media content from a remote source, and the like). In another example, media characteristic configuration module 114 may be configured to normalize, or otherwise modify, video data to conform video output for media content to a target video characteristic (e.g., brightness range, resolution, aspect ratio, color, quality, and the like), so that the video output characteristics for media content from any source, including two or more different sources, will be the same or substantially similar (e.g., video output for media content from one media service will have the same or substantially similar color, quality, resolution, aspect ratio, brightness range, and the like, as video output for media content from another media service, or another source, local or remote). In still another example, media characteristic configuration module 114 may be configured to normalize, compress, or otherwise modify, loudness data associated with media content to a target loudness range (i.e., associated with one or more target configuration profiles stored in target configuration profiles database 112), so that the loudness of media content from any source, including two or more different sources, will be the same or substantially similar (e.g., loudness of media content from one media service will be the same or similar to loudness of media content from another media service, loudness of media content from a local source will be the same or similar to loudness of media content from a remote source, and the like). In some examples, media characteristic configuration module 114 may be configured to perform psychoacoustic analysis on an audio portion of media content data to determine perceived loudness of said audio, and media characteristic configuration module 114 further may be configured to normalize, compress, or otherwise modify said audio data to conform to a target perceived loudness range specified in a target configuration profile stored in target configuration profiles database 112. In other examples, the quantity, type, function, structure, and configuration of the elements shown may be varied and are not limited to the examples provided.

In some examples, media device system 102 and car system 108 may include a communication facility configured to exchange data with one or more of network 116, satellite 118, cellular site (hereinafter "cell tower") 120, mobile device 122, and media content databases 124-126. As used herein, "facility" refers to any, some, or all of the features and structures that are used to implement a given set of functions. In some examples, media device system 102 and car system 108 may be configured to communicate, or exchange data, with one or more devices and networks using short range communication protocols, connections or pathways (hereinafter "protocols") (e.g., Bluetooth®, ultra wideband, NFC, or the like) and/or long range communication protocols (e.g., satellite, mobile broadband, global positioning system (GPS), wireless Internet (e.g., IEEE 802.11a/b/g/n) (WiFi), and the like). In some examples, media device system 102 and car system 108 may be configured to stream, download, or otherwise access media content data and metadata using one or more data communication profiles (e.g., advanced audio distribution profile (A2DP), headset profile (HSP), hands-free profile (HFP), audio/video remote control profile (AVRCP), 802.11a/b/g/n, or the like). For example, car system 108 may be configured to receive or retrieve media content data from media content database 124 and/or media content database 126 using satellite 118, which may be configured to broadcast media content (e.g., satellite radio, satellite television, or the like). In another example, media device system 102 may be configured to receive or retrieve media content data from one or both of media content databases 124-126 using network 116 (e.g., cloud, Internet, local area network (LAN), or the like). In yet another example, media device system 102 and car system 108 each may be configured to receive or retrieve media content data from one or more of media content databases 124-126 using cell tower 120, either directly or indirectly (e.g., using mobile device 122, other mobile computing or communication device, or the like). In some examples, cell tower 120 may include antennas and other communications equipment configured to provide a mobile broadband connection (e.g., 4G, 3G or the like). In still another example, media device system 102 and car system 108 each may be configured to receive or retrieve media content data from mobile device 122, which may include storage or memory for storing media content. In some examples, mobile device 122 may be implemented as a smartphone, a tablet, or other mobile communication or mobile computing device. In some examples, mobile device 122 may include, without limitation, a touchscreen, a display, one or more buttons, or other user interface capabilities. In some examples, mobile device 122 also may be implemented with various audio and visual/video output capabilities (e.g., speakers, video display, graphic display, and the like). In some examples, mobile device 122 may be configured to operate various types of applications associated with media, social networking, phone calls, video conferencing, calendars, games, data communications, and the like. In some examples, mobile device 122 may be implemented as a media device configured to store, access and play media content.

In some examples, media content database 124 may be owned, operated, or otherwise used, by a media provider or media service (hereinafter "media service") (e.g., Pandora®, Spotify®, Rdio®, Last.fm®, Hulu®, Netflix®, and the like), and media content database 126 may be owned, operated, or otherwise used, by another media service. In other examples, media content database 124 may be owned, operated, or otherwise used, by a media service, and media content database 126 may be owned, operated, or otherwise used by a telephone or video conferencing service (e.g., storing voicemail messages, text messages, other telephony-related data, or the like). In some examples, media presentation configuration device 110 may be configured to conform output of media content received from different sources (e.g., two different media services, a media service and another third party media content provider, a media service and a telephone or video conference provider, and the like) by conforming media content received from both media content databases 124 and 126 to a same or similar target characteristics stored in one or more target configuration profile (e.g., so that volume output, loudness output, other audio characteristics, video characteristics, and the like, remains consistent across presentation of media content across different sources). In other examples, media presentation configuration device 110 may be configured to conform output of media content received from different sources by conforming media content received from a remote source (e.g., media content databases 124 and 126, other media content sources accessible using network 116, satellite 118 or cell tower 120, and the like) and from a local source (e.g., mobile device 122 using short range communication connection, local storage implemented by media device system 102 and/or car system 108, and the like). In some examples, media device system 102 and car system 108 may be configured to detect a presence and proximity of mobile device 122 or other compatible devices (e.g., devices capable of communicating using a common protocol, devices having common services, devices having common operational capabilities, devices configured to perform same or similar functions, or the like), for example, by detecting a radio frequency or other signal from mobile device 122 using an antenna. In other examples, the quantity, type, function, structure, and configuration of the elements shown may be varied and are not limited to the examples provided.

Figure 2:
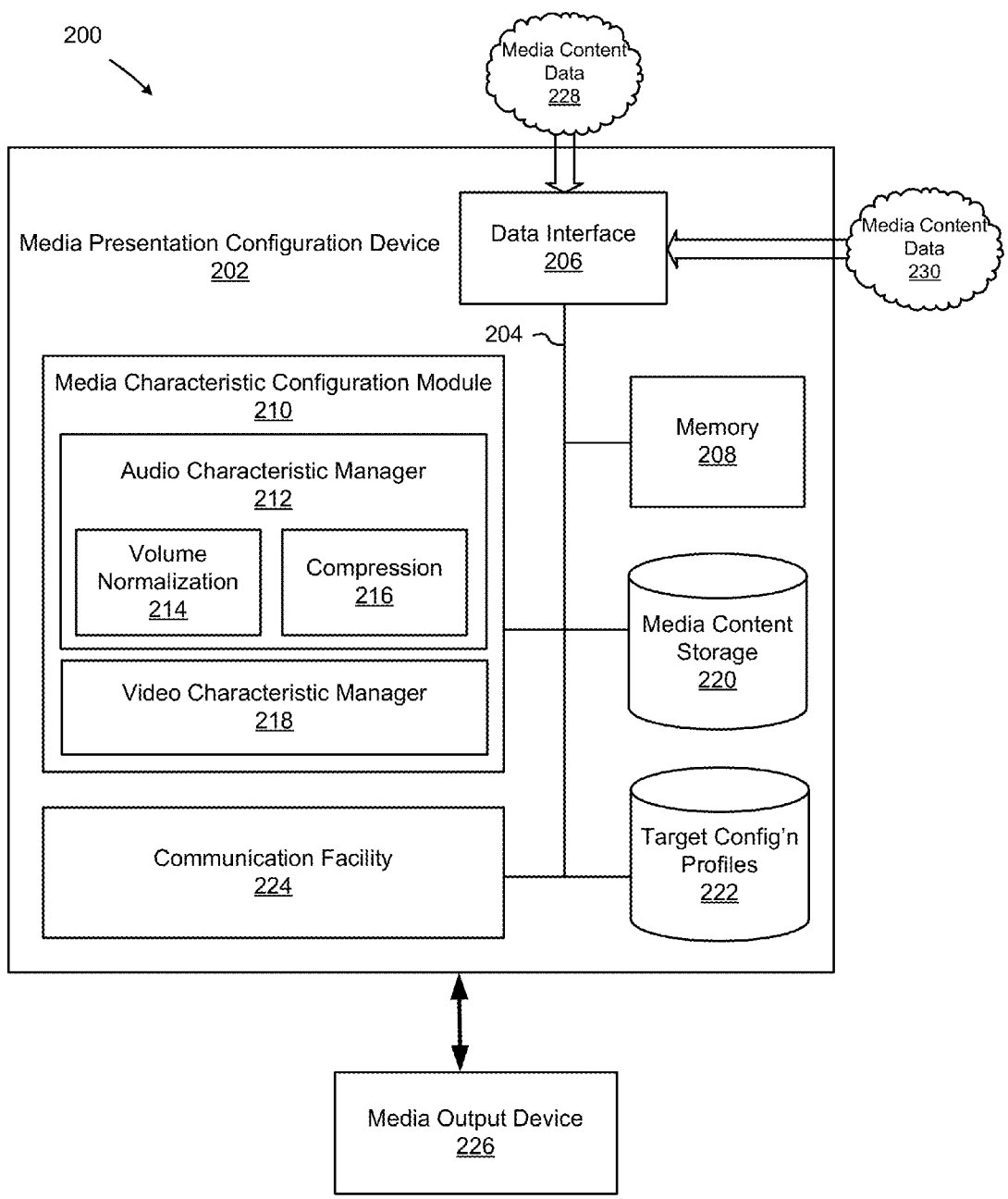
FIG. 2 illustrates an exemplary media presentation configuration device.

FIG. 2 illustrates an exemplary media presentation configuration device. Here, diagram 200 includes media presentation configuration device 202, bus 204, data interface 206, memory 208, media characteristic configuration module 210, audio characteristic manager 212, volume normalization module 214, compression module 216, video characteristic manager 218, media content storage 220, target configuration profiles database 222, communication facility 224, and media content data 228-230. Like-numbered and named elements may describe the same or substantially similar elements as those shown in other descriptions. In some example, media characteristic configuration module 210 may be configured to modify media content data 228 and media content data 230, for example, to conform media presentation characteristics associated with media content data 228 and 230 with target media presentation characteristics defined, described or specified in target configuration profiles stored in target configuration profiles database 222. In some examples, a target media characteristic may include a target audio characteristic (e.g., target volume range, target loudness range, target frequency range, target equalization, target tone or other measure of quality, and the like) for a media device (e.g., media output device 226, other media player, and the like). In some examples a target media characteristic may include a target video characteristic (e.g., target brightness level or range, resolution, aspect ratio, color, quality, and the like) for a media device (e.g., media output device 226, other media player or display, and the like). In some examples, video characteristic manager 218 may be configured to modify or adjust video data, for example, to conform said video data to a target video characteristic in a target configuration profile stored in target configuration profiles data base 222. In some examples, audio characteristic manager 212 may include one or more modules configured to normalize, compress, or otherwise modify audio data, for example, to conform said audio data to a target audio characteristic in a target configuration profile stored in target configuration profiles database 222. For example, audio characteristic manager 212 may include volume normalization module 214 configured to perform volume normalization (e.g., peak normalization, average amplitude normalization, or the like) or loudness normalization (e.g., based on measure of power, based on perceived loudness, or the like) on an audio portion of media content data 228 and 230 in order to conform volume data to a target volume range or loudness data to a target loudness range (i.e., described or otherwise included in a target configuration profile). In some examples, volume normalization module 214 may be configured to perform psychoacoustic analysis on audio portions of media content data 228 and 230 to determine and modify levels of perceived loudness, for example, to conform perceived loudness of a media content to a target perceived loudness range (i.e., described or otherwise included in a target configuration profile). In another example, audio characteristic manager 212 also may include compression module 216 configured to perform compression (e.g., audio level compression, dynamic range compression, or the like) on an audio portion of media content data 228 and 230 in order to conform volume data to a target volume range, for example, according to a maximum loudness threshold and minimum loudness threshold.

In some examples, media content data 228 may be received from a media service (i.e., a remote source) and media content data 230 may be received from a different media service (i.e., another remote source). In other examples, media content data 228 may be received from a media service (i.e., a remote source) and media content data 230 may be received from a local storage device (i.e., a local source) implemented with media presentation configuration device 202 in, for example, a media player or media system implementing media presentation configuration device 202 and media output device 226. In still other examples, media output device 226 may be implemented separately from media presentation configuration device 202. In yet other examples, media content data 228 may be received from a media service (i.e., a remote source) and media content data 230 may be received from a mobile device configured to store, play and access media content, and also configured to communicate with media presentation configuration device 202 using a short range communication protocol (i.e., local source). Media content data 228 and 230 may be received using data interface 206 and stored using media content storage 220.

In some examples, target configuration profiles database 222 may be configured to store target configuration profiles describing preferred, optimum, or otherwise predetermined, media presentation characteristics (i.e., target characteristics) for presenting media content using a media device or media device system (e.g., media output device 226, or media device system 102 and car system 108 in FIG. 1, or the like). In some examples, media content storage 220 may be configured to store media content received using data interface 206 (e.g., media content data 228-230, or the like) or communication facility 224, as well as modified or updated (i.e., "conformed") media content, for example, processed by media characteristic configuration module 210. For example, media content data 228-230 may be processed by one or more components of media characteristic configuration module 210 (e.g., audio characteristic manager 212, vide characteristic manager 218, or the like) to conform media content data 228-230 to target characteristics in a target configuration profile, thus generating conformed media content data that may be stored in media content storage 220, the conformed media content data (including, for example, conformed audio data, conformed video data, or the like) being configured to present media content using, for example, media output device 226, according to target media presentation characteristics associated with media output device 226 (e.g., within a target volume or loudness range, according to a target brightness level or resolution, or the like). In some examples, memory 208 may be implemented as volatile or non-volatile memory configured to store data received using data interface 206, as well as data associated with media characteristic configuration module 210, communication facility 224 and other components of media presentation configuration device 202. In other examples, the quantity, type, function, structure, and configuration of the elements shown may be varied and are not limited to the examples provided.

Figure 3:
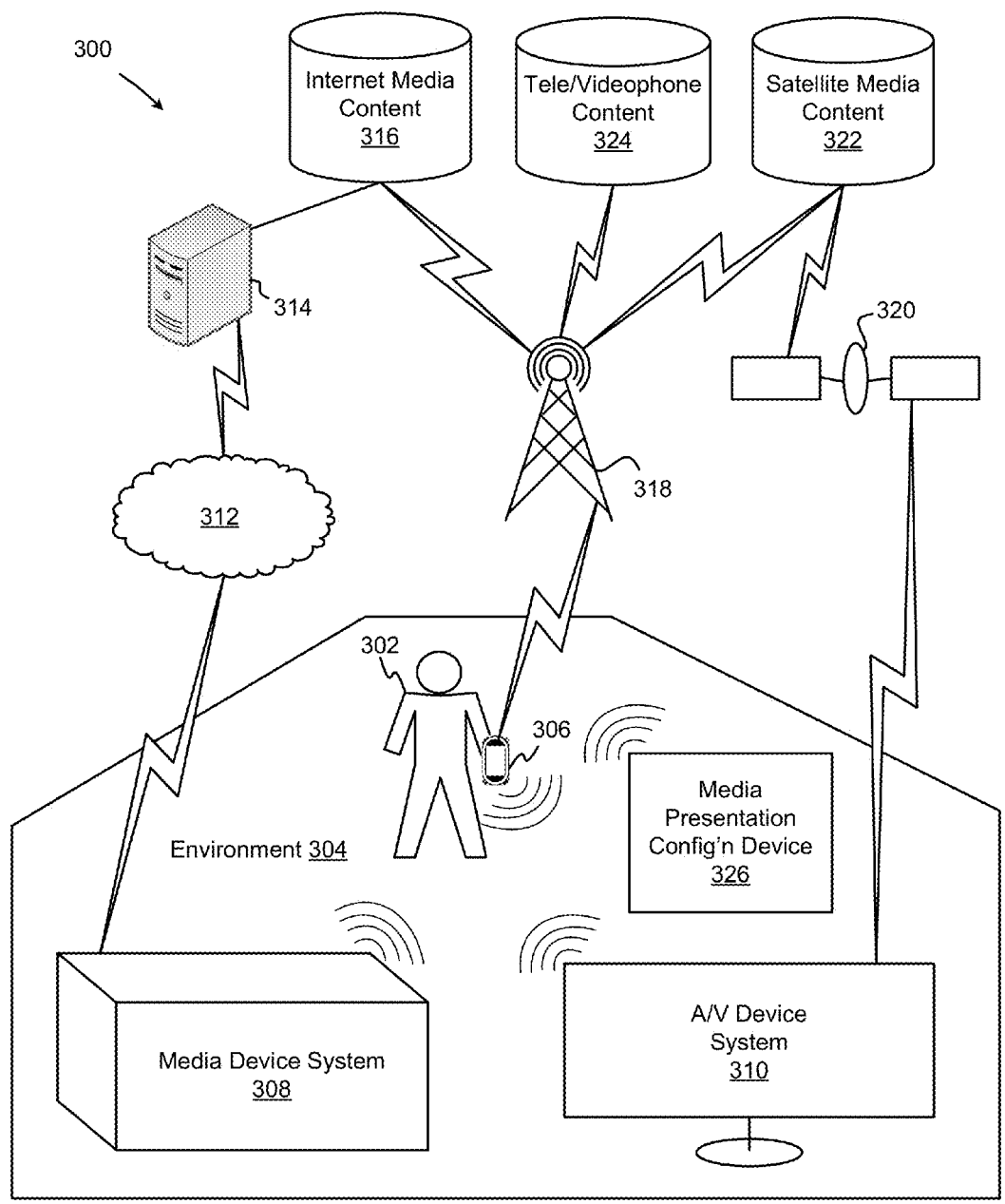
FIG. 3 illustrates exemplary interactions between exemplary device systems implementing a media presentation configuration device.

FIG. 3 illustrates exemplary interactions between exemplary device systems implementing a media presentation configuration device. Here, diagram 300 includes user 302, environment 304, mobile device 306, media device system 308, audio/video (A/V) device system 310, network 312, server 314, Internet media content database 316, cell tower 318, satellite 320, satellite media content database 322, telephone or video conferencing (hereinafter "tele/videophone") content database 324, and media presentation configuration device 326. Like-numbered and named elements may describe the same or substantially similar elements as those shown in other descriptions. In some examples, environment 304 may be an indoor space (e.g., a room, a house, an office, a conference room, a laboratory, an auditorium, a restaurant, or the like) or outdoor space (e.g., yard, patio, deck, park, or the like), wherein one or more compatible devices (e.g., mobile device 306, media device system 308, A/V device system 310, and the like) may be implemented and configured to communicate with each other (and other compatible devices in a proximity) using a short range communication protocol. For example, mobile device 306, media device system 308 and A/V device system 310 each may be configured to exchange data with each other using Bluetooth®, ultra wideband, NFC, or other short range protocols. In some examples, media presentation configuration device 326 may be implemented separately, as shown. In other examples, media presentation configuration device 326 may be implemented in one or more of mobile device 306, media device system 308 and A/V device system 310. In some examples, media presentation configuration device 326 may be configured to receive media content data from one or more of mobile device 306, media device system 308 and A/V device system 310, as shown, or from various remote databases (e.g., Internet media content database 316, satellite media content database 322, or the like) using network 312, cell tower 318, or satellite 320. In some examples, media presentation configuration device 326 may be configured to modify one or more media presentation characteristics (e.g., audio or video characteristics, as described herein, or the like) of media content to be presented by one or more of mobile device 306, media device system 308 and A/V device system 310. For example, media presentation configuration device 326 may be configured to conform a first media content from Internet media content database 316 to a target configuration profile associated with A/V device system 310 (i.e., for presenting media content using A/V device system 310), such that the first media content may be presented using A/V device system 310 according to target characteristics associated with A/V device system 310. In this example, media presentation configuration device 326 also may be configured to conform a second media content from mobile device 306 (e.g., stored in mobile device 306, indirectly from tele/videophone content database 324, or the like) to the same target configuration profile associated with A/V device system 310, such that the second media content also is presented according to said target characteristics associated with A/V device system 310 (e.g., the first media content and the second media content are presented with same or substantially similar loudness or volume ranges, brightness, or the like).

In some examples, mobile device 306, media device system 308 and A/V device system 310 also may be configured to communicate with each other, or with other devices and networks, using long range communication protocols. For example, media device system 308 may be configured to use network 312 (i.e., using WiFi), for example, to retrieve media content from Internet media content database 316. In another example, mobile device 316 may be configured to use cell tower 318 (i.e., using mobile broadband), for example, to retrieve media content from one or more of Internet media content database 316, tele/videophone content database 324, and satellite media content database 322. In still another example, A/V device system 310 may be configured to use satellite 320, for example, to retrieve media content from satellite media content database 322. In yet other examples, each of one or more of mobile device 306, media device system 308 and A/V device system 310 may be configured to access (e.g., using one or more applications, transceivers, communication facilities, and the like) each of network 312, cell tower 318 and satellite 320 to retrieve media content data from various remote databases. In some examples, media presentation configuration device 326 may be configured to conform presentation characteristics of media content received from different sources, both local and remote, as described herein, to target configuration profiles associated with each of mobile device 306, media device system 308 and A/V device system 310. In other examples, the quantity, type, function, structure, and configuration of the elements shown may be varied and are not limited to the examples provided.

Figure 4:
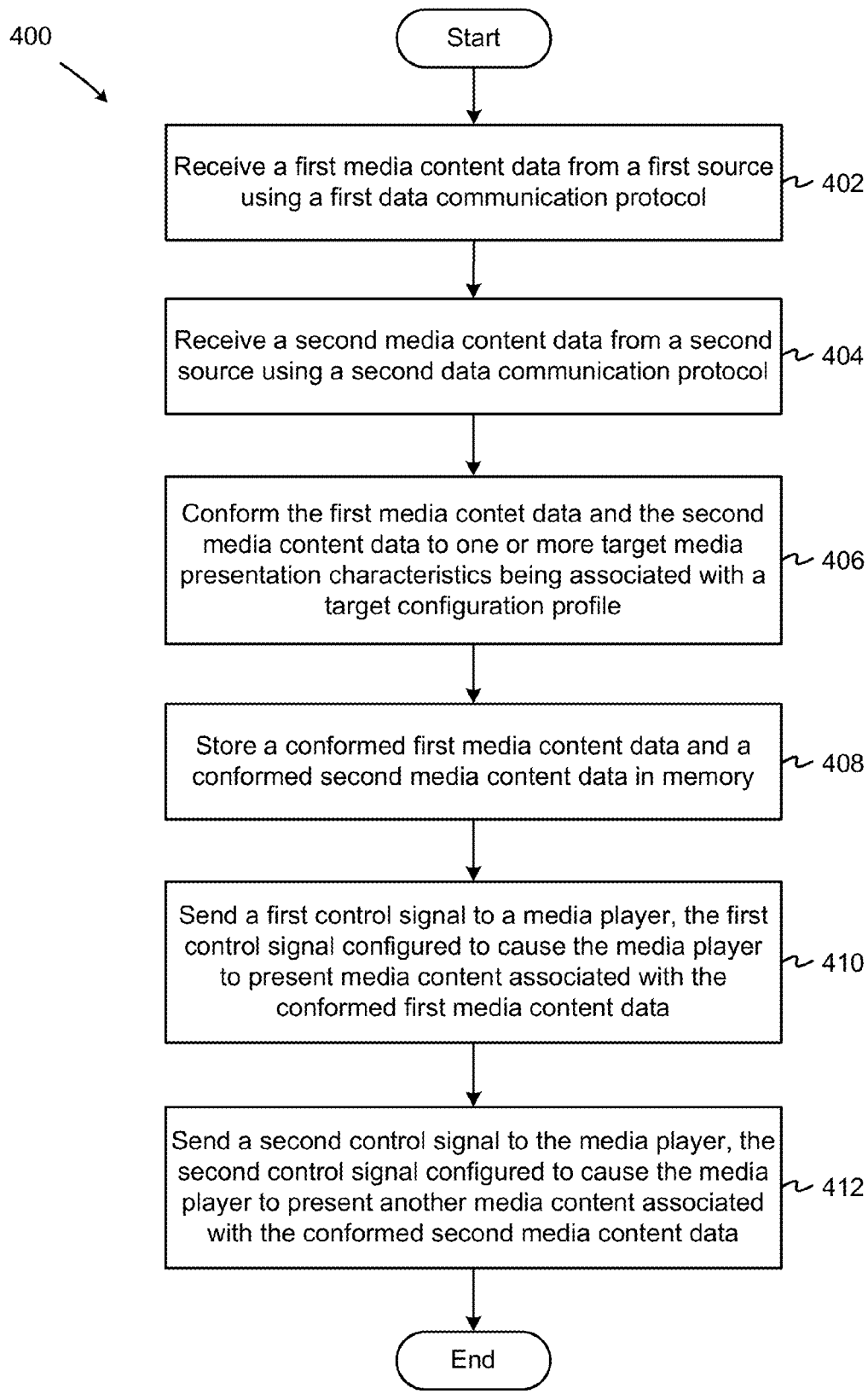
FIG. 4 illustrates an exemplary flow for conforming local and remote media characteristics data to target media presentation configuration profiles.

FIG. 4 illustrates an exemplary flow for conforming local and remote media characteristics data to target media presentation configuration profiles. Here, flow 400 begins with receiving a first media content data from a first source using a first data communication protocol (402). In some examples, said first media content data may be received by a communication facility and/or data interface implemented in a media presentation configuration device, as described herein. In some examples, the first data communication protocol (e.g., short range or long range) may be associated with one or more data communication profiles (e.g., A2DP, HSP, HFP, AVRCP, WiFi, or the like). In some examples, a second media content data may be received from a second source using a second data communication protocol (404). In some examples, the second data communication protocol may be associated with a different data communication profile than the first data communication protocol. In some examples, the first source may be a local source, and the second source may be a remote source. In other examples, the first source may be a remote source associated with a third party (e.g., media, telephony, or the like) service, and the second source may be another remote source associated with another third party service. Once received, the first media content data and the second media content data may be conformed to one or more target media presentation characteristics being associated with a target configuration profile (406), for example, by a media characteristic configuration module implemented in the media presentation configuration device. In some examples, the one or more target media presentation characteristics may include, without limitation, a volume range, a perceived loudness range, a peak amplitude, a frequency or frequency range, and the like. In some examples, the conforming the first media content data and the second media content data may be performed using, without limitation, a peak normalization algorithm, a loudness normalization algorithm, psychoacoustic analysis, a dynamic range compression algorithm, or the like. In some examples, a conformed first media content data and a conformed second media content data (i.e., as may be generated by a media characteristic configuration module) may be stored in memory (408). In some examples, said memory also may be implemented in the media presentation configuration device. In other examples, the conformed first media content data and the conformed second media content data may be stored in a storage or database (e.g., media content storage 220 in FIG. 2, or the like) implemented in the media presentation configuration device. Then, a first control signal may be sent to a media player, or other media output device (e.g., media device system 102 and car system 108 in FIG. 1, media output device 226 in FIG. 2, media device system 308 and A/V device system 310 in FIG. 3, or the like), the first control signal configured to cause the media player to present (e.g., play, display, or the like) media content associated with the conformed first media content data (410). In some examples, a second control signal may be sent to the media player, the second control signal configured to cause the media player to present another media content associated with the conformed second media content data (412), wherein the media content and the another media content may be presented with the same or substantially similar presentation characteristics.

Figure 5:
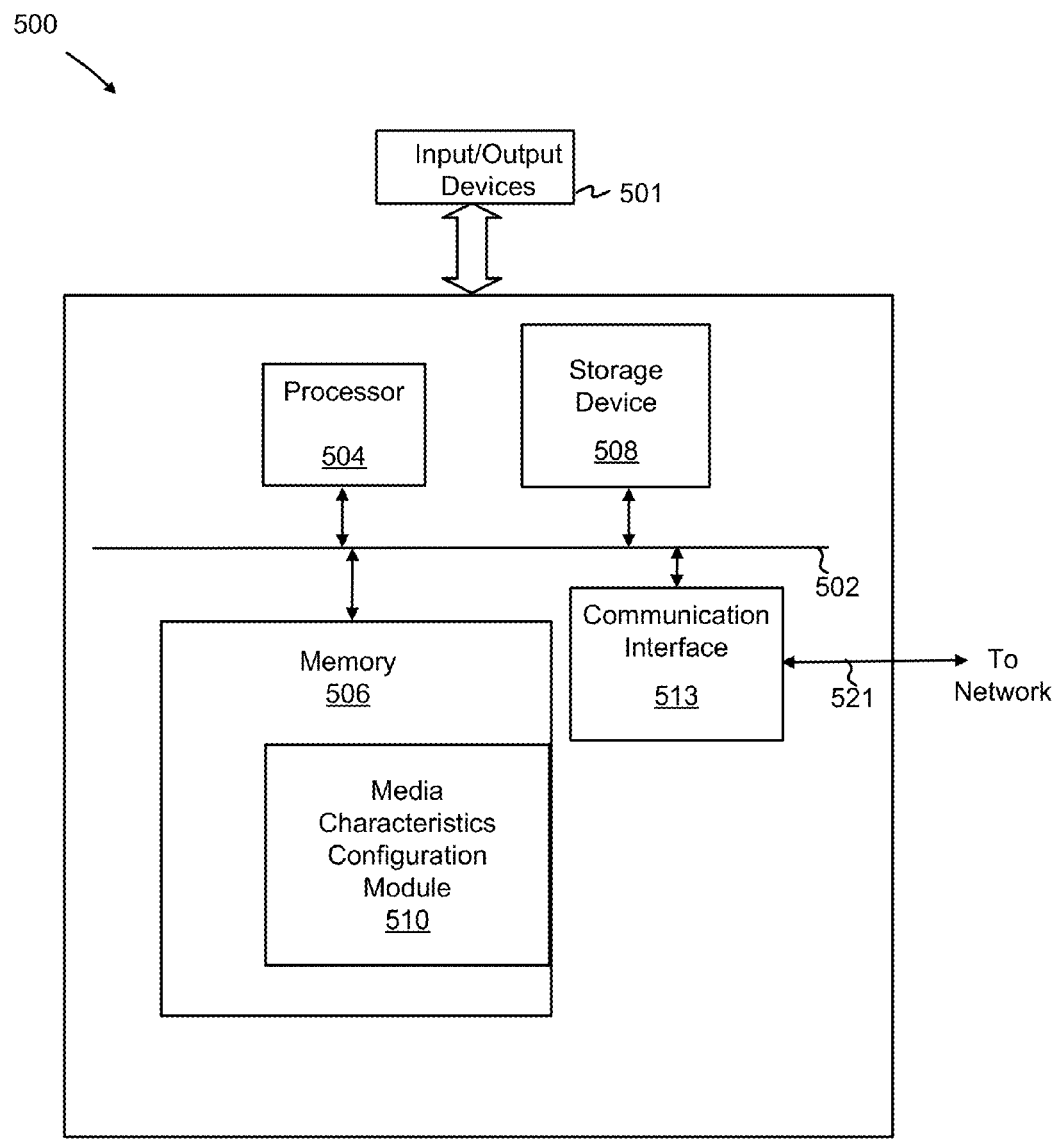
FIG. 5 illustrates an exemplary system and platform for conforming local and remote media characteristics data to target media presentation profiles.

FIG. 5 illustrates an exemplary system and platform for conforming local and remote media characteristics data to target media presentation profiles. In some examples, computing platform 500 may be used to implement computer programs, applications, methods, processes, algorithms, or other software to perform the above-described techniques. Computing platform 500 includes a bus 502 or other communication mechanism for communicating information, which interconnects subsystems and devices, such as processor 504, system memory 506 (e.g., RAM, etc.), storage device 508 (e.g., ROM, etc.), a communication interface 513 (e.g., an Ethernet or wireless controller, a Bluetooth controller, etc.) to facilitate communications via a port on communication link 521 to communicate, for example, with a computing device, including mobile computing and/or communication devices with processors. Processor 504 can be implemented with one or more central processing units ("CPUs"), such as those manufactured by Intel® Corporation, or one or more virtual processors, as well as any combination of CPUs and virtual processors. Computing platform 500 exchanges data representing inputs and outputs via input-and-output devices 501, including, but not limited to, keyboards, mice, audio inputs (e.g., speech-to-text devices), user interfaces, LCD or LED or other displays, monitors, cursors, touch-sensitive displays, speakers, media players and other I/O-related devices.

According to some examples, computing platform 500 performs specific operations by processor 504 executing one or more sequences of one or more instructions stored in system memory 506, and computing platform 500 can be implemented in a client-server arrangement, peer-to-peer arrangement, or as any mobile computing device, including smart phones and the like. Such instructions or data may be read into system memory 506 from another computer readable medium, such as storage device 508. In some examples, hard-wired circuitry may be used in place of or in combination with software instructions for implementation. Instructions may be embedded in software or firmware. The term "computer readable medium" refers to any non-transitory medium that participates in providing instructions to processor 504 for execution. Such a medium may take many forms, including but not limited to, non-volatile media and volatile media. Non-volatile media includes, for example, optical or magnetic disks and the like. Volatile media includes dynamic memory, such as system memory 506.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 502 for transmitting a computer data signal.

In some examples, execution of the sequences of instructions may be performed by computing platform 500. According to some examples, computing platform 500 can be coupled by communication link 521 (e.g., a wired network, such as LAN, PSTN, or any wireless network) to any other processor to perform the sequence of instructions in coordination with (or asynchronous to) one another. Computing platform 500 may transmit and receive messages, data, and instructions, including program code (e.g., application code) through communication link 521 and communication interface 513. Received program code may be executed by processor 504 as it is received, and/or stored in memory 506 or other non-volatile storage for later execution.

In the example shown, system memory 506 can include various modules that include executable instructions to implement functionalities described herein. In the example shown, system memory 506 includes media characteristics configuration module 510 configured to modify presentation characteristics of media content to conform to target configuration profiles (e.g., stored in storage device 508, or the like), as described herein.

In some embodiments, various devices described herein may communicate (e.g., wired or wirelessly) with each other, or with other compatible devices, using computing platform 500. As depicted in FIGS. 1-3 herein, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in FIGS. 1-3 can represent one or more algorithms. Or, at least one of the elements can represent a portion of logic including a portion of hardware configured to provide constituent structures and/or functionalities.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, media presentation configuration devices 110, 202 and 326, including one or more components, can be implemented in one or more computing devices that include one or more circuits. Thus, at least one of the elements in FIGS. 1-3 can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

The foregoing description, for purposes of explanation, uses specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention. Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A device, comprising:
a media characteristic configuration module implemented using a processor, the media characteristic configuration module comprising an audio characteristic manager configured to modify a first audio portion of a first media content data received from a first source to conform the first audio portion to a target audio characteristic indicated in a target configuration profile, and to modify a second audio portion of a second media content data received from a second source to conform the second audio portion to the target audio characteristic indicated in the target configuration profile, the media characteristic configuration module further comprising a video characteristic manager configured to conform video data to a target video characteristic in the target configuration profile;
a communication facility configured to receive the first media content data from the first source using a first data communication protocol and to receive the second media content data from the second source using a second data communication protocol; and
a storage device configured to store a plurality of target configuration profiles and target configuration data associated with a plurality of media content.

2. The device of claim 1, wherein the first audio portion and the second audio portion comprise metadata associated with one or more audio characteristics.

3. The device of claim 1, wherein the media characteristic configuration module further comprises a video characteristic manager configured to modify a video portion of the first media content data to conform the video portion to a target video characteristic indicated in the target configuration profile.

4. The device of claim 1, wherein the first media content data is associated with media content provided by a media service and the second media content data is associated with another media content provided by another media service.

5. The device of claim 1, wherein the first media content data is associated with media content provided by a media service and the second media content data is associated with a telephone call.

6. The device of claim 1, wherein the first data communication protocol is associated with an advanced audio distribution profile (A2DP), and the second data communication protocol is associated with an IEEE 802.11 (WiFi) standard.

7. The device of claim 1, wherein the first data communication protocol is associated with a headset (HSP) profile, and the second data communication protocol is associated with an IEEE 802.11 (WiFi) standard.

8. The device of claim 1, wherein the first data communication protocol is associated with an audio/video remote control profile (AVRCP), and the second data communication protocol is associated with an advanced audio distribution profile (A2DP).

9. The device of claim 1, wherein the first data communication protocol is associated with a satellite communication protocol and the second data communication protocol is associated with an IEEE 802.11 (WiFi) standard.

10. The device of claim 1, wherein the target audio characteristic comprises a target volume range and the audio characteristic manager is configured to normalize a volume data from the first audio portion and another volume data from the second audio portion using the target volume range.

11. The device of claim 1, wherein the target audio characteristic comprises a target perceived loudness range and the audio characteristic manager is configured to perform psychoacoustic analysis and to normalize a loudness of the first audio portion and another loudness of the second audio portion using the target perceived loudness range.

12. The device of claim 1, wherein the audio characteristic manager is configured to implement a compression algorithm.

13. The device of claim 1, wherein the audio characteristic manager is configured to implement a dynamic range compression algorithm.

14. The device of claim 1, wherein the audio characteristic manager is configured to implement a peak volume normalization algorithm.

15. The device of claim 1, wherein the audio characteristic manager is configured to implement a perceived loudness normalization algorithm.

16. The device of claim 1, wherein the audio characteristic manager is further configured to substantially match an audio characteristic of the first audio portion with the audio characteristic of the second audio portion.

17. The device of claim 1, wherein the target configuration data associated with the plurality of media content comprises metadata from two or more media services comprising the first source and the second source.

18. The device of claim 1, wherein the first source comprises a local source configured to exchange data with the communication facility using a short range communication protocol.

19. The device of claim 1, wherein the second source comprises a remote source configured to exchange data with the communication facility using a long range communication protocol.

* * * * *